UNITED STATES PATENT OFFICE.

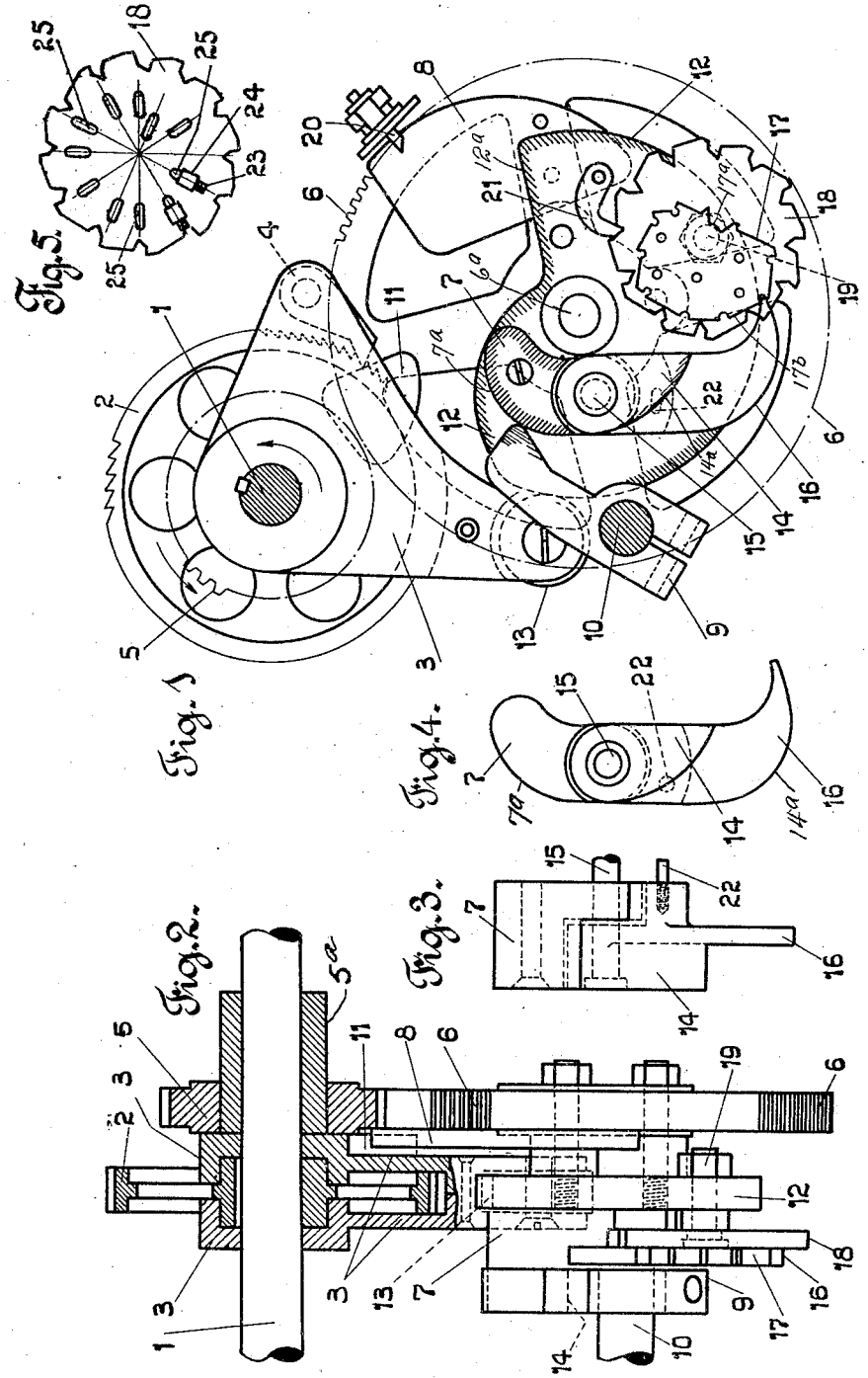

GUSTAAF ANTON WILHELM REVERMANN, OF UTRECHT, NETHERLANDS.

MECHANICAL MOVEMENT.

1,362,266. Specification of Letters Patent. Patented Dec. 14, 1920.

Application filed July 23, 1919. Serial No. 312,864.

*To all whom it may concern:*

Be it known that I, GUSTAAF ANTON WILHELM REVERMANN, subject of the Queen of the Netherlands, residing at Utrecht, Netherlands, have invented certain new and useful Improvements in Mechanical Movements, of which the following is a specification.

This invention relates to improvements in mechanical stokers and it is particularly directed to improving the type of stokers in which the fuel is first fed down into a shovel and is then thrown by the shovel onto the fire.

One of the objects of the invention is to provide improved mechanism for imparting intermittent rotary movement to the fuel feeding shaft, and rocking movement to the shovel shaft from a rotatable gear or the like.

A further object of the invention is to provide means for holding the shovel stationary while the fuel is being fed into the same.

A still further object is to provide means for causing the shovel shaft to throw the fuel varying distances during successive operations, so that the fuel may be evenly distributed over the fire.

With the foregoing objects outlined and with other objects in view, the invention consists in the novel features hereinafter described in detail, illustrated in the accompanying drawing, and more particularly pointed out in the appended claims.

Figure 1 is a side view of my improved mechanism.

Fig. 2 is an edge view, partly in section, of the same.

Fig. 3 is an edge view of an adjustable cam used in the mechanism.

Fig. 4 is a side view of said cam.

Fig. 5 is a plan view of a modification of a detail.

In the drawing 1 designates the shaft of the fuel feeder or crushing roll (not shown) to which is fixed an intermittently operated ratchet wheel 2. Loosely mounted on the hub of the ratchet wheel and located at each side of said gear is a triangular rocking plate 3. These plates 3 are connected together and located at one corner of the same is a pivotally mounted pawl 4 which engages the teeth of the ratchet wheel 2 and intermittently rotates the same when said plates 3 are rocked.

Rotatably mounted on the shaft 1 is a driving pulley $5^a$ to which is fixed a gear 5 that continuously rotates a gear 6 mounted on a shaft $6^a$ (shown in Fig. 1). The gear 6 rotates in a clockwise direction and it carries a rigidly mounted cam 12, which is engaged during a portion of its travel by a roller 13 carried by the plates 3. The gear 6 also carries a rigidly mounted short cam 8 which extends a farther distance from the shaft $6^a$ than any portion of the cam 12, and during a portion of a revolution of the gear 6, the roller 13 rolls on the cam 12 and maintains the axis of the roller 13 at a point to the left of a vertical line passing through the axis of shaft 1. When the roller 13 reaches the substantially radially extending face $12^a$ of the cam 12 gravity tends to swing the roller 13 into alinement with the vertical line passing through the axis of the shaft 1 and the plate 8 in rotating will strike a lug 11 fixed to the plates 3 and swing the plates in an anti-clockwise direction. During this movement the pawl 4 will ride over the teeth of the ratchet wheel 2, and when the cam 12 again engages the roller 13 it will swing the plate 3 to the left and cause the pawl 4 to turn the wheel 2 a portion of a revolution. As the ratchet wheel is fixed to the shaft 1, it will be seen that the shaft 1 will be intermittently rotated during rotation of the wheel 5. Variation of the intermittent movement of the shaft 1 and consequent regulation of the fuel supply may be accomplished by holding the pawl free from the ratchet wheel during a portion of the movement of the plates 3 to the left. During intermittent rotation of the fuel feeding shaft 1 it is desirable to rock the shovel shaft 10 and this is accomplished in the following manner. The shovel shaft is urged in one direction by springs (not shown) and it is provided at one end with an arm 9 which is moved in the opposite direction, by means which will now be described.

Fixed to the cam 12 is a small cam 7 having one face $7^a$ which is substantially concentric with the axis of the shaft $6^a$. This cam has a movable extension 14 which is pivotally mounted on a spindle 15 projecting from the cam 12, and this extension 14 carries a pawl 16 that engages a snail or stepped cam 17, which is fixed to a ratchet wheel 18 that rotates on a spindle 19 fixed to the cam 12. During rotation of the wheel 6 the free end of the arm 9 engages the outer faces 7ª and 14ª of the cams 7 and 14 and this moves the arm 9 and shaft 10 in an anticlockwise direction. This movement of the shovel shaft 10 stretches the spring (not shown) which moves the shaft in the opposite direction, and as the cam 14 has rotated a sufficient distance, the arm 9 will ride off the cam and be returned to its normal position by the spring.

In order to place the spring, which moves the arm 9 and shaft 10, under varying degrees of tension during operation of the mechanism, a lug 20 is placed in the path of movement of the ratchet wheel 18. As the gear 6 rotates it will carry the wheel 18 past this lug 20 and said lug will engage the teeth and move the ratchet wheel a distance corresponding to the distance between two of the teeth of said ratchet. As the snail cam 17 is fixed to the ratchet wheel it will also be turned slightly during this movement. It will thus be seen that when the pawl 16 is engaging the portion 17ª of the snail 17 the face 14ª of the cam 14 may be moved farther toward the axis of the shaft 6ª than when the pawl 16 is engaging the face 17ᵇ of the snail cam 17.

A pawl 21 carried by the cam 12 prevents the ratchet 18 from rotating in a clockwise direction and if the lug 20 remains in the path of the ratchet 18, said ratchet will be moved one step during each revolution of the gear 6. If the lug 20 is withdrawn or moved away from the path of movement of the ratchet 18 said ratchet and the snail cam 17 will remain stationary relatively to the gear 6.

During rotation of the gear 6, the cam 14 and pawl 16, when they reach a position to the right of the axis of the shaft 6ª, will under centrifugal action have a tendency to move away from the snail cam 17 but this movement is limited by a stop pin 22, which is fixed to the cam 14 and enters a curved slot in the cam 12.

If it is considered that the shovel shaft 10 is rocked a different amount or successively decreasing amounts during successive revolutions of the gear 6, it will be seen that the shovel will throw the first shovelful of fuel a maximum distance and successive shovelfuls successively decreasing distances so that an entire fire may be evenly covered with coal.

The special construction of the cam 7—14 which moves the arm 9 of the shovel shaft provides several advantages over the known constructions. As the cam 7 is partly concentrical with the axis of the shaft 6ª, the arm 9 of the shovel shaft remains, during a predetermined period, in the same position, which is a different position from that assumed while the arm is engaged with the surface 14ª. In consequence the shovel remains stationary while it is being filled through actuation of the fuel feeding shaft 1.

The present construction which permits a rotating member to impart intermittent rotation to the fuel feeding shaft and rocking motion to the shovel shaft, facilitates erection of the mechanism in a minimum amount of space. This is particularly advantageous on board of ships.

It is possible to simplify the construction set forth by transmitting the motion of the arm 9 directly to the plates 3 of the fuel feeding shaft, so that the cam 12 and the lug 11 may be eliminated.

As shown in Fig. 5 the snail cam 17 may be substituted by convolutely arranged pins 23, which are adjustably mounted in collars 24, that are radially adjustable in slots 25 forming part of the ratchet wheel 18.

I am aware that various modifications may be made in the construction illustrated without departing from the spirit of the invention, as set forth in the following claims:—

What I claim and desire to secure by Letters Patent is:—

1. Mechanism including a rotatable member, a shaft, means actuated by the rotatable member for imparting intermittent rotary movement to the shaft, a rock-shaft, and means actuated by the rotatable member for rocking the rock shaft in one direction during rotation of the rotatable member.

2. Mechanism including a shaft, a ratchet wheel fixed to said shaft, a rocking member carrying a pawl which engages the teeth of the wheel and moves the same when the rocking member is moved in one direction, a lug and roller carried by the rocking member, a rotatable member, and a plurality of cams fixed to said rotatable member, one of said cams being engageable with the roller of the rocking member for moving the same in one direction, and the other cam coöperating with the lug for moving the rocking member in the opposite direction.

3. A mechanism of the kind defined by claim 2 in which the rotatable member actuates means for imparting rocking movement to a rock shaft.

4. In combination with a rotatable member and a rock shaft, a cam movable with the rotatable member and having a pivoted extension, adjustable means limiting movement of the pivoted extension, and means actuated by the cam and extension for moving the rock-shaft in one direction.

5. A combination as defined in claim 4 in which the adjustable means includes steps convolutely arranged around an axis, and means for rotating said steps during rotation of the rotatable member.

6. A combination as defined in claim 4, in which the adjustable means include steps convolutely arranged around an axis, a ratchet wheel carrying said steps and fixed to the rotatable member and means arranged in the path of movement of said ratchet wheel for causing intermittent movement of the ratchet wheel during rotation of the rotatable member.

7. In a mechanical stoker, a rotatable member, an intermittently rotated shaft, a rocking member having means for actuating the shaft when the member is moved in one direction, means actuated by the rotatable member for rocking said rocking member, a rock-shaft and means actuated by the rotatable member for moving the rock shaft in one direction during rotation of the rotatable member.

8. A mechanism of the kind defined by claim 7 in which the last named means includes a part for holding the rock shaft stationary during a portion of a revolution of said rotatable member.

In testimony whereof I affix my signature.

GUSTAAF ANTON WILHELM REVERMANN.